L. S. NORBURY.
NON-SKIDDING TIRE APPLIANCE.
APPLICATION FILED JULY 21, 1913.
1,109,699.
Patented Sept. 8, 1914.
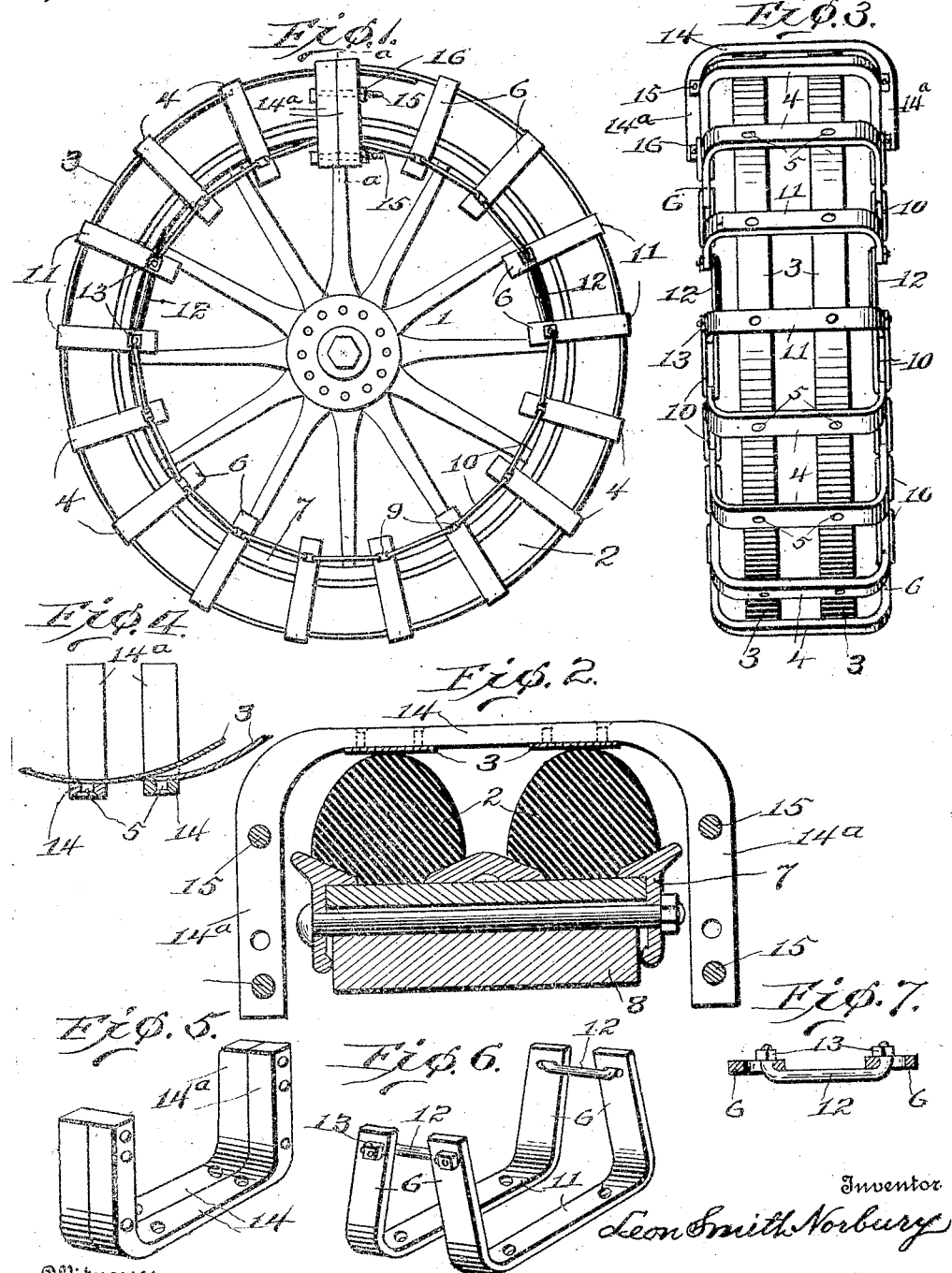

UNITED STATES PATENT OFFICE.

LEON SMITH NORBURY, OF BROOKLYN, NEW YORK.

NON-SKIDDING TIRE APPLIANCE.

1,109,699.     Specification of Letters Patent.    Patented Sept. 8, 1914.

Application filed July 21, 1913. Serial No. 780,322.

*To all whom it may concern:*

Be it known that I, LEON SMITH NORBURY, a citizen of the United States, residing at Brooklyn, in the county of Kings and State of New York, have invented certain new and useful Improvements in Non-Skidding Tire Appliances, of which the following is a specification.

This invention relates to vehicle tires, and pertains especially to traction and non-skidding attachments for automobile tires.

The object of the invention is to provide a non-skidding device for truck vehicles, especially applicable to automobile tires of various character, and to furnish a non-skidder of such novel and peculiar construction and arrangement of parts as to be expeditiously applied, and which shall not injure or interfere with the ordinary tire, but which shall assist traction and prevent the wheels from slipping or skidding.

A further object of the invention is to provide a non-skidding device of such novel and peculiar construction and arrangement of parts as to be capable of adjustment in the application thereof without detaching or separating the parts thereof, and to furnish special means therein whereby the skidder may follow every movement of a cushion or resilient tire.

Various other objects, advantages, and improved results are attainable in the practical application of the invention.

In the accompanying drawings forming part of this application: Figure 1 is a side elevation of a wheel, showing the application of the invention. Fig. 2 is an enlarged sectional view taken on the plane indicated by the dotted line *a—a* Fig. 1. Fig. 3 is an elevation of the non-skidder looking at the periphery. Fig. 4 is a sectional view of the clamping bars and band ends. Fig. 5 is a perspective view of the clamping bars. Fig. 6 is a perspective view of one pair of the connected tread bars. Fig. 7 is an enlarged sectional view of one pair of the rigid bars.

The same reference characters denote the same parts throughout the several views of the drawings.

For the purpose of illustration the device is shown as applied to an automobile truck wheel 1, having a double rubber tire 2. The manner of applying the device to said tire, or any other of the well known resilient tires, will be hereinafter explained.

In carrying out my invention I employ a pair of steel spring bands 3, spaced apart so as to engage the periphery of the tire at equal distance from the peripheral center thereof. The bands are connected crosswise by a plurality of tread bars 4 secured to and across the bands by countersunk rivets 5, and having ends 6 depending from the bands radially toward the axis of the wheel, and said ends project beyond the wheel rim 7, and wheel felly 8 so as to protect said wheel parts without engaging the same. The said ends 6 are provided with slots 9, and are loosely connected in two sets by means of links 10 hung in said slots. The two sets of bars 4 are separated by two pairs of tread bars 11, the duplicate of the bars 4, and have the same position relative to the bands 3, as the bars 4. While the bars 4 of each set are loosely connected together, the bars 11 are connected together in pairs by means of a U-shaped rod 12 having screw ends extending through the ends of the bars 11, for nuts 13. The ends of the bands 3 are connected so as to open and close the skidder in applying it to a tire, and said connection is such as to afford means for varying the size of the skidder according to the size of the tire to which it is applied, and in order to accomplish the same I employ a pair of cross-bars 14 similar to the bars 4 and 11, except that the bars 14 have enlarged ends 14ª for bolts 15, provided with suitable nuts 16. One end of each band is secured to one of the bars 14, and the other of the bars 14 is secured to the bands so as to leave the other end of the bands projecting for the purpose of having the bands over-lap and for affording a length of bands sufficient to permit the skidder to be applied to tires of various size without leaving a space between the ends of the bands. The ends of the bars 14 are linked with the adjacent bars 4, and the bolts 15 are of sufficient length to permit variation in the size of the skidder. The bars 14 form a tread clamp for the bands. It is obvious that the skidder may be applied to and removed from a tire by removing the bolts 15, so as to permit the skidder to be opened sufficiently to be slipped on or off the tire, and without detaching or separating any other part or parts of the skidder.

It has been found that in connecting all the tread bars together by connected links fixed to each bar such means of connection will not permit the device to be opened sufficiently for applying and removing the same, therefore certain of the bars are connected in pairs by the U-shaped rods which are removed in applying and removing the device so as to permit the device to be spread fully open for at least half its circumference. It will be seen that the rod-connected bars are separated by removing the rods 12, that the clamping ends of the bands 3 may be sprung open to any extent desired, and that the pairs of bolted bars 11 separate the bars 4 into two sets, one of such sets adapted to be given wider opening movement than the other set.

I do not wish to confine my invention to any particular size, shape, or material of which it is or may be made, nor to limit the same in its practical manufacture and application, but reserve to myself the right to make such changes and variations therein as may come within the scope of the appended claims.

Having thus described my invention what I claim as new and desire to secure by Letters Patent is:—

1. A non-skidding tire appliance comprising a pair of resilient bands for encircling the tire, clamping tread bars connecting the bands, a plurality of tread bars secured to and extending across the bands and having ends projecting over the sides of the tire, removable rods connecting certain of the plurality of tread bars, and means for flexibly connecting the rod-connected bars with the other tread bars.

2. A non-skidding tire appliance comprising a pair of resilient bands encircling the tire, a plurality of tread bars secured to and extending across the bands and having projecting ends, clamping tread bars connecting the bands, two pairs of tread bars secured to the bands and connected in pairs for separating said plurality of bars into two sets, rods connecting said pairs of bars and adapted to be removed so as to permit one of said sets to be swung open, means for loosely connecting one set of the bars with a bar of each of said pairs, and means for loosely connecting the other set of bars with the other bar of said pairs and with the clamping bars.

3. A non-skidding tire appliance comprising a pair of resilient bands encircling the tire, a plurality of tread bars secured to and extending across the bands and forming a continuous tread and having radially depending ends, rods connecting certain of the bars in pairs and adapted to be removed for spreading these bars apart, a tread clamping member secured to each end of the bands and having slotted ends, and means for loosely connecting the said depending ends together and with the rod-connected bars and with the clamping members.

In witness whereof I hereunto set my hand in the presence of two witnesses.

LEON SMITH NORBURY.

Witnesses:
  CHARLES KUEBLER,
  HENRY B. DAVENPORT.